US009914786B2

(12) United States Patent
De Wit

(10) Patent No.: US 9,914,786 B2
(45) Date of Patent: *Mar. 13, 2018

(54) PROCESS TO PREPARE CROSSLINKED CELLULOSE ETHERS, CROSSLINKED CELLULOSE ETHERS OBTAINABLE BY SUCH PROCESS AND THE USE THEREOF

(71) Applicant: AKZO NOBEL N.V., Arnhem (NL)

(72) Inventor: Paulus Pieter De Wit, Westervoort (NL)

(73) Assignee: Akzo Nobel Chemicals International B.V., Arnhem (NL)

(*) Notice: Subject to any disclaimer, the term of this patent is extended or adjusted under 35 U.S.C. 154(b) by 79 days.

This patent is subject to a terminal disclaimer.

(21) Appl. No.: 14/795,314

(22) Filed: Jul. 9, 2015

(65) Prior Publication Data
US 2015/0307631 A1 Oct. 29, 2015

Related U.S. Application Data

(63) Continuation of application No. 12/937,813, filed as application No. PCT/EP2009/054348 on Apr. 10, 2009, now Pat. No. 9,115,217.

(60) Provisional application No. 61/046,116, filed on Apr. 18, 2008.

(30) Foreign Application Priority Data

Apr. 14, 2008 (EP) ..................... 08154474

(51) Int. Cl.
C08B 15/05 (2006.01)
C08B 15/10 (2006.01)
C08B 31/00 (2006.01)
C08B 15/00 (2006.01)
C08B 5/00 (2006.01)

(52) U.S. Cl.
CPC .............. C08B 15/005 (2013.01); C08B 5/00 (2013.01)

(58) Field of Classification Search
CPC .......... C08B 15/05; C08B 15/10; C08B 31/00
USPC .............................. 536/56, 62, 106, 117, 124
See application file for complete search history.

(56) References Cited

U.S. PATENT DOCUMENTS

| 3,106,531 | A | 10/1963 | Lindenfors |
| 3,374,224 | A | 3/1968 | Sommers |
| 3,574,188 | A | 4/1971 | Takehara et al. |
| 3,658,790 | A | 4/1972 | Bernardia |
| 3,661,895 | A | 5/1972 | Germino et al. |
| 4,035,195 | A | 7/1977 | Podlas |
| 4,183,765 | A | 1/1980 | Podlas |
| 4,250,306 | A | 2/1981 | Lask et al. |
| 4,321,367 | A | 3/1982 | Cheng et al. |
| 4,404,371 | A | 9/1983 | Bellmann et al. |
| 9,115,217 | B2* | 8/2015 | De Wit ............. C08B 15/005 |
| 2002/0119116 | A1 | 8/2002 | Sahatjian et al. |
| 2008/0009616 | A1 | 1/2008 | Frank et al. |

FOREIGN PATENT DOCUMENTS

| EP | 824096 A1 | 1/1998 |
| EP | 1 260 522 B1 | 4/2006 |
| GB | 3955106 A | 2/1981 |
| GB | 215834 A | 8/1985 |
| JP | 51 028185 A | 3/1976 |
| SU | 1549966 | 3/1990 |
| WO | WO 80/00842 | 5/1980 |
| WO | WO 98/27117 A | 6/1998 |
| WO | WO 2003/093395 A1 | 11/2003 |
| WO | WO 2005/030279 A1 | 4/2005 |
| WO | WO 2005/123781 A | 12/2005 |

OTHER PUBLICATIONS

Barbucci et al. Synthesis, chemical and rheological characterization of new hyaluronic acid-based hydrogels, J. Biomater Sci. Polymer Edn, vol. 11, No. 4, pp. 383-399 (2000).
Heinze et al., "Esterification of Polysaccharides," Inorganic Polysaccharide Esters, Springer Laboratory, p. 136, 2006 (3 Pages).
International Search Report, PCT/EP2009/054348, dated Jun. 19, 2009, 15 pages.
European Search Report, EP 08154474.4, dated Sep. 19, 2008, 9 pages.
Leone Gemma, et al., "New Phosphorylated Derivatives of Carboxymethylocellulose With Osteogenic Activity", Polymers for Advanced Technologies Jul. 2008 John Wiley and Sons Ltd., The Atrium GB, vol. 10, No. Jan. 2008, pp. 824-830.
Dulong V, et al., "Hyaluronan-based Hydrogels Particles Prepared by Cross-Linking With Trisodium Trimetaphosphate, Synthesis and Characterization", Carbohydrate Polymers, Applied Science Publishers, Ltd. Barking, GB, vol. 57., No. 1, Aug. 12, 2004, pp. 1-6.

(Continued)

Primary Examiner — Shaojia Anna Jiang
Assistant Examiner — Everett White
(74) Attorney, Agent, or Firm — Sandra B. Weiss

(57) ABSTRACT

The invention relates to a dry or slurry process to prepare phosphate-crosslinked cellulose ethers from a cellulose starting material comprising the steps of adding an alkalizing agent to the cellulose starting material to achieve mercerization, adding an etehfying agent to the reaction mixture to achieve etherification of the cellulose, and adding a crosslinking agent to the reaction mixture to achieve crosslinking of the cellulose, wherein at least part of the alkalizing agent is added to the cellulose starting material before the etherification and/or crosslinking reactions take place to obtain alkalized cellulose; the crosslinking agent and the etherifying agent are added one after the other in random order or simultaneously; the crosslinking agent is an alkali metal thmetaphosphate; and the crosslinking and etherification steps are performed at an elevated temperature. Additionally, the invention relates to crosslinked cellulose ethers obtainable by the above process having a viscosity and/or water absorption capacity higher than their non-crosslinked equivalents and the use thereof.

12 Claims, No Drawings

(56) References Cited

OTHER PUBLICATIONS

Gliko-Kabir, I, et al., "Phosphated Crosslinked Guar for Colon-Specific Drug Delivery—I. Preparation and Physicochemical Characterization", Journal of Controlled Release, Elsevier, Amsterdam, NL., vol. 63, No. 1-2, Jan. 1, 2000, pp. 121-127.
Chatterjee, P.K., Gupta, B.S., eds., Textile Science and Technology, vol. 13, Absorbent Technology (Elesevier 2002), Chapter VII entitled "Crosslinked Cellulose and Cellulose Derivatives".
Luneva et al., Vetsi Akademii Navak BSSR, Seryya Khimichnykh navuk (1989), (6), 92-95, English abstract provided.

* cited by examiner

PROCESS TO PREPARE CROSSLINKED CELLULOSE ETHERS, CROSSLINKED CELLULOSE ETHERS OBTAINABLE BY SUCH PROCESS AND THE USE THEREOF

REFERENCE TO RELATED APPLICATION(S)

This application is a continuation of U.S. patent application Ser. No. 12/937,813, filed on Oct. 14, 2010, which is a national stage filing under 35 U.S.C. § 371 of PCT/EP2009/054348, filed Apr. 10, 2009, which claims priority to European Patent Application No. 08154474.4, filed Apr. 14, 2008, and U.S. Provisional Patent Application No. 61/046,116, filed on Apr. 18, 2008, the contents of which are each incorporated herein by reference in their entirety.

The present invention relates to a process to prepare phosphate-crosslinked cellulose ethers, to phosphate-crosslinked cellulose ethers obtainable by such a process, and the use thereof.

JP 51028185 discloses a process to prepare a phosphate-crosslinked carboxymethyl cellulose (CMC) by adding to CMC 5-30% of sodium hexametaphosphate (SHMP), blending the mixture, and heating to a temperature between 100 and 160° C. In all examples the crude (or intermediate) CMCs were purified in one way or another to obtain materials with a neutral or acidic pH before crosslinking. The products made are said to be ion exchange materials with low swelling power, which materials are generally not soluble in aqueous systems and consequently do not contribute to any viscosity enhancement. Besides, clearly such products do not have a high water absorption capacity when they have low swelling capacity.

As the preparation of cellulose ethers takes place at an alkaline pH, it would be much less laborious to start the crosslinking step with a non-purified alkaline cellulose ether, omitting the intermediate step of adjusting the pH as required by the process disclosed in JP 51028185. It might also be advantageous to carry out the crosslinking step under alkaline conditions prior to or simultaneously with the etherification step.

WO 2005/123781 discloses a process to prepare a water-absorbing polysaccharide, comprising the steps of contacting an uncrosslinked polysaccharide such as carboxymethyl cellulose (CMC) or hydroxyethyl cellulose (HEC) with a polyphosphate or polyphosphoric acid as the crosslinking agent in the presence of water while forming a polysaccharide gel, and subsequently crosslinking said polysaccharide gel. The crosslinking reaction is performed under alkaline conditions and at a temperature of 70-300° C. The thus obtained polysaccharide gel is subsequently dried, resulting in a polymer preferably containing no more than 10 wt % of water that can be ground to give a powder.

The process disclosed in WO 2005/123781 is disadvantageous because it requires the formation of a gel before the crosslinking step is performed, which gel subsequently needs to be dried again, making this process difficult to incorporate into a common cellulose etherification process. The crosslinked products obtained by the process disclosed in this application are characterized by a slimyness of 1, which implies that after wetting of the crosslinked cellulose the particles form a gel in which the separate particles are still recognizable.

In P. K. Chatterjee, B. S. Gupta, eds., *Textile Science and Technology* Vol. 13, *Absorbent Technology* (Elsevier 2002), Chapter VII entitled "Crosslinked Cellulose and Cellulose Derivatives", an overview of crosslinking agents for cellulose derivatives is provided. Many crosslinking agents are mentioned, including phosphorous oxychloride, which is an undesired chemical from a health and safety point of view.

The purpose of the present invention is to provide a process to prepare phosphate-crosslinked cellulose ethers that can be operated at a relatively low temperature while reducing the number of steps, and as a consequence is more (energy) efficient. Additionally, a purpose of the invention is to provide a process in which a non-hazardous (green) crosslinking agent can be used. Another purpose of the invention is to provide crosslinked cellulose ethers that have a higher viscosity than their non-crosslinked equivalents and are soluble in an aqueous solution.

It has now been found that the drawbacks of the state of the art can be removed and the above purpose achieved by a dry or slurry process to prepare phosphate-crosslinked cellulose ethers from a cellulose starting material comprising the steps of adding an alkalizing agent to the cellulose starting material to achieve mercerization, adding an etherifying agent to the reaction mixture to achieve etherification of the cellulose, and adding a crosslinking agent to the reaction mixture to achieve crosslinking of the cellulose, wherein at least part of the alkalizing agent is added to the cellulose starting material before the etherification and/or crosslinking reactions take place to obtain alkalized cellulose;

the crosslinking agent and the etherifying agent are added one after the other in random order or simultaneously;

the crosslinking agent is an alkali metal trimetaphosphate; and the crosslinking and etherification steps are performed at an elevated temperature.

It is understood that in the above process more alkalization and etherification steps can be performed. In one embodiment, etherification steps may be performed with different etherifying agents, or with a mixture containing more than one etherifying agent, resulting in a cellulose ether containing different substituents.

In a preferred embodiment the crosslinking agent and the etherifying agent are added to the reaction mixture when it has an alkaline pH. Alternatively, though less preferred, the crosslinking agent and/or the etherifying agent may already have been added to the cellulose starting material before the alkaline agent is added. In such an embodiment the etherification and crosslinking reactions will not start before the addition of the alkaline agent.

A dry or slurry process means a process wherein the reaction medium consists of dry flocs, which are dry or wetted solid particles (flocs) which are—in general—relatively free-flowing, or consists of a slurry, which slurry encompasses solid particles suspended (and/or dispersed) in a fluid reaction medium.

The reaction may be conducted in a relatively large amount of diluent or with a minimal amount of diluent as desired, i.e. giving the so-called slurry and the so-called dry process, respectively.

In this specification, the term slurry process stands for a process where the weight ratio of liquid medium to cellulose is greater than 10, while a dry process means a process where the weight ratio of liquid medium to cellulose is equal to or smaller than 10, preferably smaller than 5, more preferably smaller than 3. Typically, a dry process is carried out in a high-efficiency intensive mixer, e.g. a plowshare mixer.

The terms dry and slurry are used to specifically exclude a process wherein the reaction medium is a gel. A gel can be defined as a colloidal system which is soft and jelly-like, which is mostly liquid in composition but has the structural coherence of a solid.

It should be understood that reacting cellulose ethers with phosphate compounds, like STMP, in a solution, especially a lowly concentrated solution, does not lead to crosslinked cellulose ethers but to phosphorylated cellulose ethers instead, i.e. to cellulose ethers that are substituted with phosphate groups.

Additionally, the invention provides phosphate-crosslinked cellulose ethers obtainable by the above process, characterized in that they have a higher viscosity than their non-crosslinked equivalents when measured in an aqueous solution, and the use thereof as thickeners, water binders, water retention agents, stabilizers, rheology modifying agents, as well as the use thereof in mining, building, in coatings, adhesives, oil drilling, and health care applications.

It has been found that when cellulose ethers are crosslinked, the viscosity of the products increases at first, but if the crosslinking reaction continues, the viscosity decreases to below the level of the non-crosslinked substituted equivalent cellulose compound. If the reaction is completed before the viscosity falls below the starting viscosity, a product is obtained that has a higher viscosity and is still soluble in water.

In accordance with the invention the viscosity of the non-crosslinked and crosslinked cellulose ethers is measured using a TA Instruments AR 1000 Rheometer at $0.1\ s^{-1}$ using a 40 mm, 4° steel cone and plate geometry at 25° C. For the viscosity measurement a solution of the cellulose ether of 1, 1.5, 2, 3 or 4 wt % in water is taken. The concentration at which the viscosity of the crosslinked cellulose ether is determined is the concentration at which the non-crosslinked equivalent has a viscosity of between about 1,000 and 5,000 mPas.

The phosphate-crosslinked cellulose ethers according to the invention having a higher viscosity than their non-crosslinked equivalents are soluble in water, which means that in general when wetted they first form a gel and after the addition of further water they will dissolve.

In a preferred embodiment, the phosphate-crosslinked cellulose ethers obtainable by the process are crosslinked with 0.00001-0.75 mol % of STMP per anhydroglucose unit, preferably with 0.0001-0.5 mol % STMP per anhydroglucose unit.

Additionally, it has been found that when the cellulose ethers are crosslinked, an initial increase in water absorption capacity occurs. Upon further crosslinking this water absorption capacity decreases to even below the level of the non-crosslinked equivalent cellulose ether. Hence, slight crosslinking not only turns out to be a means to increase the viscosity but also a means to increase the water absorption power of the cellulose ethers.

Additionally, the invention provides phosphate-crosslinked cellulose ethers obtainable by the above process, characterized in that they have a higher water absorption capacity than their non-crosslinked equivalents, and the use thereof as thickeners, water binders, water retention agents, stabilizers, rheology modifying agents, as well as the use thereof in mining, building, in coatings, adhesives, oil drilling, and health care applications.

It has surprisingly been found that in the process of the invention, the reaction under alkaline conditions with sodium trimetaphosphate (STMP) clearly gives cross-linked product of the cellulose ether, while SHMP (sodium hexametaphosphate) and STPP (sodium tripolyphosphate) provide barely any cross-linked product under the same reaction conditions.

The term "elevated temperature" used for the crosslinking and etherification steps of the process of the present invention means a temperature above 20° C., preferably of above 40° C., most preferably of above 60° C. The temperature in a preferred embodiment is below 100° C., preferably below 95° C., and most preferably below 90° C.

The crosslinking step in the process is generally performed at a temperature of 40-120° C. In a preferred embodiment for the preparation of crosslinked CMC, the temperature is 50-80° C., even more preferably 60-70° C.

The gel-free process of the invention can be performed at a reaction temperature of 65° C., while some of the state of the art processes require a temperature of 100° C. or higher and, moreover, it was found not to be necessary to purify the reaction product as some state of the art processes require. In one embodiment, consequently, the crosslinking step of the process may immediately follow the etherification step without any intermediate neutralization or acidification step while maintaining an alkaline pH, or may even take place overlapping or simultaneously with the etherification step. Nor does the process of the invention require the formation of a gel of the cellulose before the crosslinking step can be performed, which makes the process much more efficient as there is then no need to dry the gel again. Moreover, the process of the invention provides crosslinking on the cellulose backbone, i.e. does not require carboxyalkyl groups for the crosslinks to be formed.

The cellulose product of the invention is preferably etherified with at least one carboxyalkyl, alkyl and/or hydroxyalkyl substituent, more preferably a carboxyalkyl and/or alkyl substituent having 1 to 6 carbon atoms, even more preferably 1-3 carbon atoms, and/or a hydroxyalkyl substituent having 2-6 carbon atoms, even more preferably 2-3 carbon atoms. Also minor amounts of long chain alkyl substituents may be present, containing 6-24 carbon atoms, and quaternary ammonium substituents. Even more preferably, the substituted cellulose is carboxymethyl cellulose (CMC), hydroxyethyl cellylose (HEC), hydroxypropyl cellulose (HPC), methyl cellulose (MC), methyl hydroxyethyl cellulose (MHEC), ethyl hydroxyethyl cellulose (EHEC), methylethyl hydroxyethyl cellulose (MEHEC), methyl hydroxypropyl cellulose (MHPC) or a hydrophobically modified analogue thereof, most preferred are CMC, EHEC, and MEHEC.

The etherifying agents can be selected from the group of epoxyalkanes, halogenated alkanes, and halogenated carboxylic acids, but are not limited thereto.

The fluids (diluents) used in the process to form the reaction medium may be any solvent or liquid medium known to the person skilled in the art that provides a good mixing of the reactants and prevents smearing of the reactor content before or during etherification and crosslinking (i.e. does not lead to the formation of a gel). The composition of the fluid mixture may be changed during the process. For example, in the etherification and crosslinking steps different fluids can be present in the reaction mixture.

Suitable diluents include alcohols, ketones, such as acetone, methyl ethyl ketone, ethers, water, or mixtures of two or more of these diluents. In a preferred embodiment for the preparation of a crosslinked carboxyalkyl cellulose, the fluid may be an alcohol, more preferably a C1-C4 alcohol, like isopropyl alcohol or ethanol, or a mixture of an alcohol and water. For the preparation of a crosslinked (hydroxyl) alkyl cellulose the fluid may be an alcohol, an ether or one of the etherifying agents. One or more of the etherifying agents may also act as a diluent. In a preferred embodiment for the preparation of EHEC the fluid may be ethyl chloride.

The amount of liquid medium is such that the cellulose content is preferably 5-70 wt % on total weight of liquid medium plus crosslinked substituted cellulose.

The crosslinking agent and the etherifying agent can be added to the reaction mixture in the presence or absence of a fluid. The fluid should not be chosen such that the reaction mixture will become a gel. It is within the skills of a person skilled in the art, using the above disclosure, to choose the right fluids.

The alkaline pH during the crosslinking step of the process is generally higher than 7, preferably higher than 8, more preferably higher than 9 and preferably lower than 14, more preferably lower than 13, even more preferably below 11.

The alkaline pH during the etherification step of the process is generally higher than 7, preferably higher than 9, more preferably higher than 10. Preferably, the pH is below 14.

It is known to a person skilled in the art that during an etherification the pH decreases. Therefore, in one embodiment it may be necessary to add additional alkaline agent to keep the pH in the desired alkaline range during the etherification.

It should be understood that the more alkaline the pH is during the etherification and crosslinking steps, the lower the elevated temperature may be. Indeed, as a person skilled in the art will acknowledge, one should not perform the reaction steps at both an extremely alkaline pH and an extremely high reaction temperature, as under such circumstances the crosslink will become susceptible to degradation, which is undesirable.

It is understood that it is possible to purify the end products of the process of the invention. Suitable methods for purifying are known to a person skilled in the art. Purification can for example be carried out by washing procedures, as they are known for cellulose ethers in the state of the art. At a high crosslinking degree when the amount of water-insoluble cellulose ethers increases, washing can even be done with cold water.

The invention is illustrated by the examples below, which are not limiting for the invention

EXAMPLES

In the Examples the following test methods are employed:
The Settling Volume Measurement 1.5 grams of the dried (crosslinked) cellulose ether are thoroughly mixed with 100 ml water in a 100 ml measuring cylinder. After standing for 4 hours a sediment may be formed, giving a certain settling volume, expressed in ml.

The settling volume is used as a measure for the crosslink density of the product. A settling volume of >90 ml in the above test indicates that the product contains no or few insolubles (no or only slight crosslinking). A settling volume of <25 ml (for a purified material) or <35 ml (for a crude material) indicates a lot of sedimentation and is a measure for a dense crosslink network.

Turbidity Measurement

The turbidity of a solution of (crosslinked) cellulose ether in water was measured using a Monitek® Model 251 turbidimeter (forward scatter design, Monitek GmbH). The turbidity value is related to the amount of insoluble material in a solution. Light crosslinking, which enhances the viscosity, will not give a remarkable increase in the amount of insoluble material and thus a lower value for turbidity. The turbidity will however go up when the amount of crosslinks increases, which gives rise to considerable amounts of insoluble material.

Viscosity Measurement

The viscosity of a solution of (crosslinked) cellulose ether in water was measured with a TA Instruments AR 1000 Rheometer at $0.1 \text{ s}^{-1}$ using a 40 mm, 4° steel cone and plate geometry. For the viscosity measurement a solution of the cellulose ether of 1, 1.5, 2, 3 or 4 wt % in water is taken. The concentration at which the viscosity of the crosslinked cellulose product is determined is the concentration at which the non-crosslinked equivalent cellulose ether has a viscosity of between about 1,000 and 5,000 mPas.

Water Absorption Capacity

The water absorption capacity of the crosslinked cellulose ethers was determined using a tea bag test. 50 mg (crosslinked) cellulose ether were weighed into a sealable teabag of approx 7.5 cm×7.5 cm. After being sealed the teabag was soaked in a container with water for 20 minutes. The teabag was removed from the container and drained for one minute on a paper towel. The weight of the tea bag with (crosslinked) cellulose ether was determined before and after water absorption, as was the weight of a reference without (crosslinked) cellulose ether. The number of grams of water absorbed per gram of (crosslinked) cellulose ether was calculated.

The following materials were used
Sodium trimetaphosphate (STMP): Sigma T5508
Sodium tripolyphosphate (STPP): Acros Organics No. 218675000
Sodium hexametaphosphate (SHMP): Aldrich No. 305553
Cellulose was used from both a cotton linters and a wood source, as further specified below.

Example 1

Preparation of Crosslinked CMC in Ethanol 16.6 kg cellulose (cotton linters) were mixed with 10.0 kg ethanol and 16.1 kg of a 50 wt % aqueous solution of caustic soda. After mixing for 24 minutes, 1.22 kg of 75 wt % solution of monochloroacetic acid in ethanol were added. The mixture was heated to 80° C. in about 30 minutes and after stirring for 50 minutes at this temperature the mixture was cooled to room temperature. The pH of a 2% solution in water was 11.5.

350 g of the crude reaction mixture, having a CMC content of about 42 wt %, were taken and 100 g ethanol/water (60/40 w/w) were added thereto. To this mixture were added 0.34 g sodium hydroxide in 10 ml water and 7.97 g sodium trimetaphosphate (STMP) in 80 ml water (4 mole % relative to the anhydroglucose units). The mixture was mixed for 30 minutes at room temperature, heated to 80° C. in 30 minutes, and mixed for another hour at 80° C. After cooling down the mixture was dried for 30 minutes at 65° C. in a fluid bed dryer. The resulting product was subjected to a settling volume test, giving a 30 ml settling volume.

Example 2

Preparation of Crosslinked CMC in Ethanol 116 g of the crude reaction mixture of Example 1, having a CMC content of about 42 wt %, were suspended in 300 ml ethanol water (40/60 w/w). 0.166 g of sodium trimetaphosphate (STMP) dissolved in 40 ml of water was added, corresponding to 0.25 mole % STMP relative to the amount of anhydroglucose units of the CMC. The mixture was mixed for 2 hours at room temperature, heated to 80° C. in about 45 minutes, and mixed for an additional 15 minutes. After cooling down, 100 ml of ethanol were added and the mixture was neutralized with acetic acid. The cellulose product was filtered off and washed with ethanol/water (65/35 w/w), twice with ethanol/water (80/20 w/w), and once with 96% ethanol. The purified product was dried in vacuum at 30° C., after which it was analyzed using the methods below. Using the above method, the viscosity was measured in a 1% solution in water. The turbidity of a 1 wt % solution in water was measured using the above method.

Example 2 was repeated with different amounts of STMP which correspond to 0.00 (Comparative Example 2a), 0.05 (Example 2b), 0.50 (Example 2d), 0.75 (Example 2e), and 1.00 (Example 2f) mole % STMP per anydroglucose unit of the CMC.

The results are given in Table 1 below.

TABLE 1

Characteristics of the crosslinked cellulose ethers of Example 2

| Example | STMP (mole %) | STMP (gram) | Viscosity of 1% solution (mPas) | Turbidity of 1% solution (ppm) |
|---|---|---|---|---|
| 2a (comparative) | 0.00 | | 2840 | 57 |
| 2b | 0.05 | 0.033 | n.d. | 79 |
| 2c | 0.25 | 0.166 | 5880 | 65 |
| 2d | 0.50 | 0.332 | 12090 | 75 |
| 2e | 0.75 | 0.497 | 4430 | 496 |
| 2f | 1.00 | 0.663 | n.d. | >1000 | n.d. means not determined

It is demonstrated that using relatively low amounts of crosslinking agent gives products that have a higher viscosity than their non-crosslinked equivalents. Also it is demonstrated that a higher degree of crosslinking gives an increased turbidity, i.e. an increased amount of insolubles.

Example 3

Preparation of Crosslinked CMC in Isopropyl Alcohol 687 g of cellulose (wood cellulose) were mixed with 906 g of isopropyl alcohol and 701 g of an aqueous solution of 49 wt % of caustic soda. After mixing for 20 minutes 453 g of isopropyl alcohol and 473 g of a 80 wt % solution of monochloro-acetic acid in water were added. The mixture was heated to 80° C. in about 30 minutes and after stirring for 90 minutes at this temperature the mixture was cooled down to 30° C. An amount of 73 grams of sodium trimeta-phosphate (6 mole % relative to the anhydroglucose units) in 654 ml of water was added to the reaction mixture. The mixture was heated to 65° C. in 30 minutes and kept at this temperature for 30 minutes. The reaction mixture was cooled down to room temperature and dried in a fluid bed dryer for 30 minutes at 65° C.

The settling volume was determined using the above method. The settling volume was found to be 21 ml. The viscosity of a 2% solution of the product was measured using above method and found to be less than 100 mPas.

Example 4

Preparation of Crosslinked CMC in Isopropyl Alcohol

The procedure of Example 3 was followed with the following deviations.

Before the addition of monochloroacetic acid, an amount of caustic soda was added to the mixture as specified in Table 2 below.

The amount of STMP added was 0.00 (Comparative Example 4a), 0.50 (Example 4b), 0.75 (Example 4c), 1.00 (Example 4d), 1.25 (Example 4e), and 3.00 (Example 4f) mole %, respectively, relative to the anhydroglucose units in the cellulosic starting material. The amounts are specified in Table 2 below.

TABLE 2

Caustic soda and STMP used in Example 4

| Example | Caustic soda (50 wt %) (g) | STMP (mole % re AGU) | STMP (g in 650 ml water) |
|---|---|---|---|
| 4a (comparative) | 675 | 0 | 0 |
| 4b | 678 | 0.50 | 6.1 |
| 4c | 679 | 0.75 | 9.2 |
| 4d | 681 | 1.00 | 12.2 |
| 4e | 683 | 1.25 | 15.3 |
| 4f | 694 | 3.00 | 36.6 |

The viscosity and settling volume of the products obtained were determined. The viscosity was measured using a 2% solution of the non-purified product using the above method. Additionally, the water absorption capacity of the crosslinked cellulose ethers was determined using the above tea bag test.

TABLE 3

Settling volume and viscosity of crosslinked cellulose ether products of Example 4

| Example | STMP (mole % on AGU) | Settling volume (ml) | Viscosity (2% solution) (mPas) | Water absorption capacity (g/g) |
|---|---|---|---|---|
| 4a (comparative) | 0.00 | >90 | 3907 | 30 |
| 4b | 0.50 | >90 | 28120 | 62 |
| 4c | 0.75 | >90 | 20890 | 52 |
| 4d | 1.00 | >90 | 10280 | 45 |
| 4e | 1.25 | >90 | 4033 | 39 |
| 4f | 3.00 | 41 | n.d. | 23 |

It is demonstrated that using relatively low amounts of crosslinking agent gives products that have a higher viscosity and water absorption capacity than their non-crosslinked equivalents.

Comparative Examples 5 and 6

Preparation of Crosslinked CMC Using other Phosphate Crosslinking Agents

Example 3 was repeated with the following deviation. Instead of sodium trimeta-phosphate (STMP) an equivalent amount of sodium tripolyphosphate (STPP) was used (Comparative Example 5) or an equivalent amount of sodium hexameta-phosphate (SHMP) was used (Comparative Example 6). The settling volume of the products obtained was measured. The viscosity was also measured for the product of Example 6 in a 2% solution using a Brookfield viscositymeter, type LVF, at 30 rpm and 25° C.

TABLE 4

Characteristics of crosslinked cellulose ether products of Comparative Examples 5 and 6

| Comparative Example | Amount of phosphate crosslinker (g) | Settling volume (ml) | Viscosity of 2% solution (mPas) |
|---|---|---|---|
| 5 | 88 | >90 | |
| 6 | 76 | >90 | 14,640 |

The high settling volumes show that these alternative crosslinking agents give no or barely any crosslinks in a cellulose ether. The viscosity increase measured for the product of Comparative Example 6 compared to comparative Example 4a was found to be the result of a small degree of crosslinking having taken place when using SHMP.

Example 7

Preparation of Crosslinked CMC in Isopropyl Alcohol 687 g of cellulose (wood cellulose) were mixed with 906 g of isopropyl alcohol and 714 g of an aqueous solution of 49 wt % of caustic soda. After mixing for 20 minutes, 453 g isopropyl alcohol, 473 g of 80 wt % solution of monochloroacetic acid in water, and 73 g of sodium trimetaphosphate in about 250 ml water were added. The mixture was heated to 80° C. in about 30 minutes and mixed for 90 minutes at this temperature. The reaction mixture was cooled down to room temperature and dried in a fluid bed dryer for 30 minutes at 65° C. The settling volume was found to be 80 ml.

Example 8

Preparation of Crosslinked EHEC 8 kg wood cellulose were mixed with 14 kg ethyl chloride and 6 kg of a 50 wt % aqueous solution of caustic soda. After mixing 7 kg of ethylene oxide were added in portions. The temperature was gradually increased to 100° C. and the reactor content was mixed for an additional 25 minutes. After cooling down the excess ethyl chloride was evaporated.

50 g of the crude reaction mixture, having an EHEC content of about 55 wt %, were taken and 0.8 g sodium hydroxide in 10 ml water were added thereto. After mixing for 30 minutes 3.2 g sodium trimetaphosphate (STMP) in 20 ml water were added (10 mole % relative to the amount of anhydroglucose units). The mixture was mixed for 60 minutes at 80° C. After cooling down the mixture was washed three times with 2 wt % sodium sulfate solution at 95° C. The washed material was dried for 30 minutes at 70° C. in a fluid bed dryer. The resulting product was subjected to a settling volume test, giving a 21 ml settling volume. The viscosity of a 1% solution of the product was measured using the above method and found to be less than 120 mPas.

Example 9

Preparation of Crosslinked EHEC 50 g of the crude reaction mixture of Example 8, having an EHEC content of about 55 wt %, were mixed with 0.16 g of sodium trimetaphosphate (STMP) dissolved in 20 ml of water, corresponding to 0.50 mole % STMP relative to the amount of anhydroglucose units of the EHEC. The mixture was mixed 1 hour at 80° C.

After cooling down the mixture was washed three times with 2 wt % sodium sulfate solution at 92° C. The washed material was dried for 30 minutes at 70° C. in a fluid bed dryer.

Example 9 was repeated with different amounts of STMP which correspond to 0.00 (Comparative Example 9a) and 6.6 (Example 9c) mole % STMP per anhydro-glucose unit of the EHEC. In Example 9c an amount of 0.6 gram of sodium hydroxide in 10 ml water was added before STMP addition as described in Example 8.

Using the above method, the viscosity was measured in a 1% solution in water. The results are given in Table 5 below.

TABLE 5

Characteristics of the crosslinked cellulose ethers of Example 9

| Example | STMP (mole %) | STMP (gram) | Viscosity of 1% solution (mPas) |
|---|---|---|---|
| A (comparative) | 0.00 | 0.00 | 1,155 |
| B | 0.50 | 0.16 | 1,626 |
| C | 6.6 | 2.1 | 360 |

It is demonstrated that using relatively low amounts of crosslinking agent gives products that have a higher viscosity than their non-crosslinked equivalents and that using relatively high amounts of crosslinking agent gives products with an even lower viscosity than the non-crosslinked cellulose ether.

The invention claimed is:

1. A dry or slurry process to prepare phosphate-crosslinked cellulose ethers from a cellulose starting material comprising the steps of
   adding an alkalizing agent to the cellulose starting material to achieve mercerization,
   adding an etherifying agent to the reaction mixture to achieve etherification of the cellulose, and
   adding a crosslinking agent to the reaction mixture to achieve crosslinking of the cellulose, wherein
   at least part of the alkalizing agent is added to the cellulose starting material before the etherification and/or crosslinking reactions take place to obtain alkalized cellulose;
   the crosslinking agent and the etherifying agent are added one after the other in random order or simultaneously;
   the crosslinking agent is an alkali metal trimetaphosphate; and
   the crosslinking and etherification steps are performed at an elevated temperature of between 20 and 95° C.;
   wherein the crosslinking step is carried out at an alkaline pH of higher than 7; and
   wherein the amount of crosslinking agent added to the reaction mixture is sufficiently high that the phosphate-crosslinked cellulose ethers prepared by said dry or slurry process are insoluble in water.

2. The process of claim 1 wherein the crosslinking step is carried out subsequent to the etherification step.

3. The process of claim 2 wherein the crosslinking step follows the etherification step without an intermediate neutralization step.

4. The process of claim 3 wherein the process is a slurry process that takes place in a reaction medium that is a liquid comprising water and an alcohol and the cellulose ether is a carboxyalkyl cellulose ether.

5. The process of claim 1 wherein the crosslinking step is carried out at an alkaline pH of higher than 8.

6. The process of claim 3 wherein the alkali metal trimetaphosphate is sodium trimetaphosphate.

7. The process of claim 2 wherein the process is a slurry process that takes place in a reaction medium that is a liquid comprising water and an alcohol and the cellulose ether is a carboxyalkyl cellulose ether.

8. The process of claim 2 wherein the alkali metal trimetaphosphate is sodium trimetaphosphate.

9. The process of claim 1 wherein the process is a slurry process that takes place in a reaction medium that is a liquid comprising water and an alcohol and the product of the etherification step is a carboxyalkyl cellulose ether.

10. The process of claim 9 wherein the carboxyalkyl cellulose ether is carboxymethyl cellulose ether.

11. The process of claim 9 wherein the alkali metal trimetaphosphate is sodium trimetaphosphate.

12. The process of claim 1 wherein the alkali metal trimetaphosphate is sodium trimetaphosphate.

\* \* \* \* \*